(12) United States Patent
Horiguchi et al.

(10) Patent No.: US 10,094,684 B2
(45) Date of Patent: Oct. 9, 2018

(54) METHOD OF MANUFACTURING ROTARY SCALE, ROTARY SCALE, ROTARY ENCODER, DRIVING APPARATUS, IMAGE PICKUP APPARATUS AND ROBOT APPARATUS

(71) Applicant: CANON PRECISION INC., Hirosaki-shi (JP)

(72) Inventors: Haruhiko Horiguchi, Tokyo (JP); Masahiko Igaki, Yokohama (JP)

(73) Assignee: CANON PRECISION, INC., Aomori-Ken (JP)

( * ) Notice: Subject to any disclaimer, the term of this patent is extended or adjusted under 35 U.S.C. 154(b) by 270 days.

(21) Appl. No.: 14/958,125

(22) Filed: Dec. 3, 2015

(65) Prior Publication Data

US 2016/0216137 A1      Jul. 28, 2016

(30) Foreign Application Priority Data

Jan. 26, 2015   (JP) ................................ 2015-012322

(51) Int. Cl.
*G01D 5/347*      (2006.01)
*G01D 5/244*      (2006.01)
(Continued)

(52) U.S. Cl.
CPC .......... *G01D 5/34707* (2013.01); *B25J 17/00* (2013.01); *B25J 19/021* (2013.01);
(Continued)

(58) Field of Classification Search
CPC ........... G01D 5/34707; G01D 5/24442; G01D 5/3473; G01D 5/34738; H04N 7/18; B25J 17/00; B25J 19/021; Y10S 901/47
See application file for complete search history.

(56) References Cited

U.S. PATENT DOCUMENTS 6,293,021 B1     9/2001  Freitag et al.
8,724,118 B1 *   5/2014  Burke .................. G01D 5/3473
                                                          356/4.01
2009/0256309 A1  10/2009 Hasegawa

FOREIGN PATENT DOCUMENTS

EP        0913669 A2    5/1999
EP        0927873 A1    7/1999
(Continued)

OTHER PUBLICATIONS

European Application No. 15197971.3-1568, The Extended European Search Report, dated May 27, 2016.

*Primary Examiner* — Tung T Vo
*Assistant Examiner* — Joseph W Becker
(74) *Attorney, Agent, or Firm* — Canon USA, Inc. I.P. Division (57) ABSTRACT

A method of manufacturing a rotary scale to be fixed to a rotating shaft of a rotating member includes a first step of forming, on a scale substrate, a scale pattern and a mark indicating an outer shape of the rotating shaft positioned such that a center axis of the rotating shaft coincides with a center axis of the scale pattern, a second step of cutting a first area of the scale substrate including the mark and having a first width, and a third step of cutting a second area including the mark that remains after the cutting of the first area, having a length in a circumferential direction of the scale substrate shorter than that in the first area and having a second width narrower than the first width.

4 Claims, 10 Drawing Sheets

(51) Int. Cl.
*B25J 17/00* (2006.01)
*B25J 19/02* (2006.01)
*H04N 7/18* (2006.01)

(52) U.S. Cl.
CPC ....... *G01D 5/24442* (2013.01); *G01D 5/3473* (2013.01); *G01D 5/34738* (2013.01); *H04N 7/18* (2013.01); *Y10S 901/47* (2013.01)

(56) References Cited

FOREIGN PATENT DOCUMENTS

| | | | |
|---|---|---|---|
| JP | H05-296789 | A | 11/1993 |
| JP | 2002-250640 | A | 9/2002 |
| JP | 5132398 | B2 | 1/2013 |
| WO | 91/15736 | A1 | 10/1991 |

* cited by examiner

METHOD OF MANUFACTURING ROTARY SCALE, ROTARY SCALE, ROTARY ENCODER, DRIVING APPARATUS, IMAGE PICKUP APPARATUS AND ROBOT APPARATUS

BACKGROUND OF THE INVENTION

Field of the Invention

The present invention relates to a method of manufacturing a rotary scale to be used for a rotary encoder.

Description of the Related Art

As means for detecting a movement amount and a rotation amount of a measurement object, encoders have been known. Examples of the encoders include optical encoders, magnetic encoders, and capacitive encoders. The optical encoders are constituted by a light source, a scale that reflects or transmits light emitted from the light source and is displaceable relatively to the light source, and a light-receiving element that receives the light reflected by or transmitted through the scale.

On the scale used for the optical encoders, a pattern that reflects or transmits the light is formed. Depending on the relative displacement of the scale, an amount of the light received by the light-receiving element varies. According to this characteristic, the optical encoders have a basic configuration in which they detect the displacement on the basis of a detection signal produced depending on the variation in the amount of the light received by the light-receiving element.

The optical encoders are broadly classified into rotary encoders and linear encoders, depending on a shape of the scale. The rotary encoders include an annular (doughnut-shaped) rotary scale assembled thereto whose coaxiality of the pattern is set to match those of a shaft, as a rotating shaft, and a hub. The rotary encoders detect, with an angle detection head, the displacement of the pattern formed on the rotary scale, thereby performing angle detection.

Figure 10A:
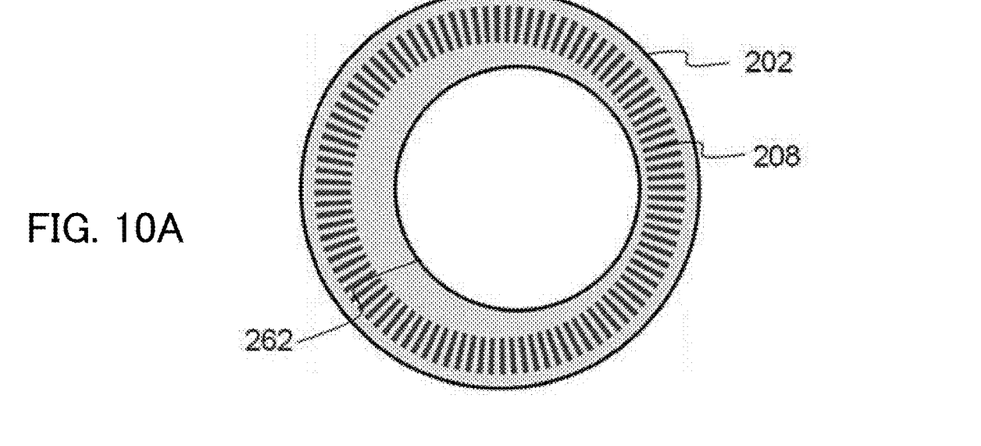
FIGS. 10A to 10C are a diagram illustrating a problem concerning a rotation angle detection error in a rotary encoder to which a conventional rotary scale is applied.
Figure 10B:
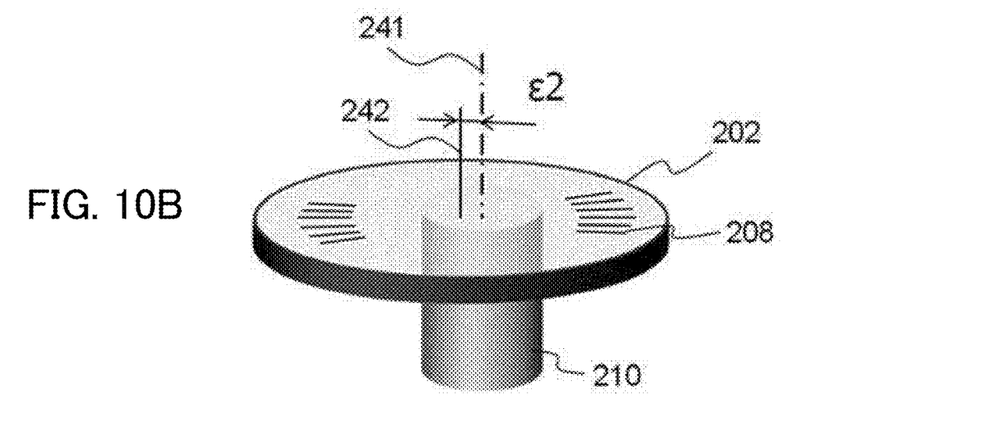
Figure 10C:
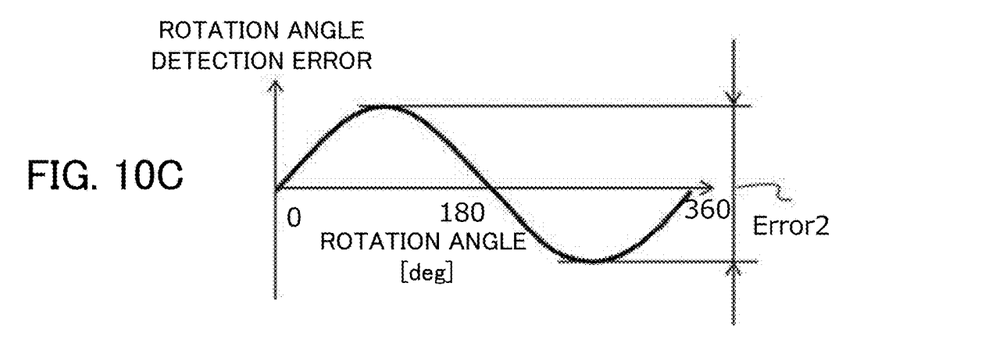

FIG. 10 is a diagram illustrating a problem concerning a rotation angle detection error caused by application of a conventional rotary scale to the rotary encoders. FIG. 10A is a schematic view of the conventional rotary scale whose outer shape has been processed. With reference to FIG. 10, a description will be given of a case of using plastic or glass as a substrate of a rotary scale 202. When the substrate of the rotary scale 202 is composed of plastic or glass, there is an advantage that a scale pattern 208 with a high resolution can be formed. However, when the substrate of the rotary scale is composed of plastic or glass, there are problems as illustrated in FIG. 10A such as a difficulty in achieving a high coaxiality and in highly accurately processing an outer shape 262 as a reference in the fixing of the rotary scale because the formation of the scale pattern 208 and the processing of the outer shape 262 are mutually different steps and both of plastic and glass are materials difficult to process.

In addition, when the rotary scale 202 having, as illustrated in FIG. 10A, a low coaxiality between the scale pattern 208 and the outer shape 262 and a low outer shape processing position accuracy is fixed to the shaft and the hub each as a rotating shaft 210 as illustrated in FIG. 10B, it is difficult to reduce an eccentricity amount ε2 between a center axis 241 of the shaft and the hub and a center axis 242 of the scale pattern 208. This difficulty has resulted in a problem that, as illustrated in FIG. 10C, it is difficult to reduce the rotation angle detection error caused by the rotary encoder with which the rotary scale is integrated.

There has been another problem that performing positioning adjustment of the scale pattern, and the shaft and the hub before fixing the rotary scale in which the scale pattern 208 and the outer shape 262 have a low coaxiality therebetween and which has a low outer shape processing position accuracy to the shaft and the hub requires a long period of time and a high cost for the positioning adjustment.

Figure 11:
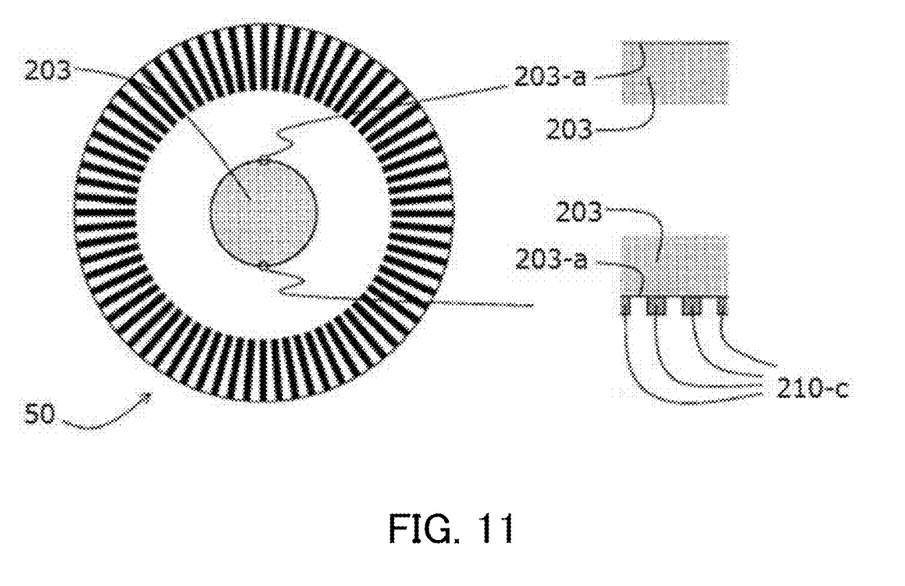
FIG. 11 is a diagram illustrating the conventional rotary scale.

Japanese Patent Application No. ("JP") 5132398 discloses a pulse code wheel 50 on which marks 210-c that allow a user to check an outer-shape processing accuracy of a marginal portion 203a of a fitting hole 203 into which the rotating shaft is to be fitted are formed as illustrated in FIG. 11. The pulse code wheel 50 disclosed in JP 5132398 allows the user to check the outer-shape processing accuracy by seeing the marks with use of a simple observation tool such as a loupe.

On the other hand, JP 2002-250640 discloses a high-accuracy rotary encoder that reads the rotary scale with multiple angle detection heads and calculates acquired data to reduce an influence of an eccentricity between the scale pattern and the outer shape.

However, employing an approach that, as in JP 5132398, checks the outer-shape processing accuracy with the observation tool such as the loupe, determines whether a processed outer shape is acceptable or not and then assembles the same leads to a low yield and an increase in cost because this approach requires a long period of time for the checking and has a low outer-shape processing accuracy.

On the other hand, reducing the influence of the eccentricity by the multiple angle detection heads as disclosed in JP 2002-250640 requires spaces to arrange the multiple angle detection heads. This requirement results in an increase in size of the rotary encoder and an increase in the number of component parts of the rotary encoder, leading to an increase in cost of manufacturing the rotary encoder.

Another possible method that integrally forms the scale pattern and the outer shape by using ultraviolet-curable plastic and thermosetting plastic also has had a difficulty in manufacturing the rotary scale having a high-resolution scale pattern.

Another example of a configuration that processes the scale pattern and an annular outer shape of the rotary scale while achieving a high coaxiality between them is a metal-etched scale, which has been conventionally commercially available. Since the scale pattern and the outer shape can be integrally processed, the metal-etched scale has an advantage that it can be manufactured such that an eccentricity amount between the scale pattern and the outer shape is small. However, forming a fine scale pattern on the metal-etched scale is difficult, which makes the metal-etched scale unsuitable for use as the high resolution rotary scale.

SUMMARY OF THE INVENTION

The present invention provides a method of manufacturing a rotary scale capable of processing an outer shape with a high accuracy while achieving a high coaxiality between a scale pattern having a high resolution and the outer shape to which a rotating shaft is fixed.

A method of manufacturing a rotary scale to be fixed to a rotating shaft of a rotating member, as an aspect of the present invention, includes a first step of forming, on a scale substrate, a scale pattern and a mark indicating an outer shape of the rotating shaft positioned such that a center axis of the rotating shaft coincides with a center axis of the scale pattern, a second step of cutting a first area of the scale substrate including the mark and having a first width, and a third step of cutting a second area including the mark that remains after the cutting of the first area, having a length in a circumferential direction of the scale substrate shorter than that in the first area and having a second width narrower than the first width.

Further features of the present invention will become apparent from the following description of exemplary embodiments (with reference to the attached drawings).

DESCRIPTION OF THE EMBODIMENTS

Exemplary embodiments of the present invention will be described below with reference to the fixed drawings.

Embodiment 1

Figure 1:
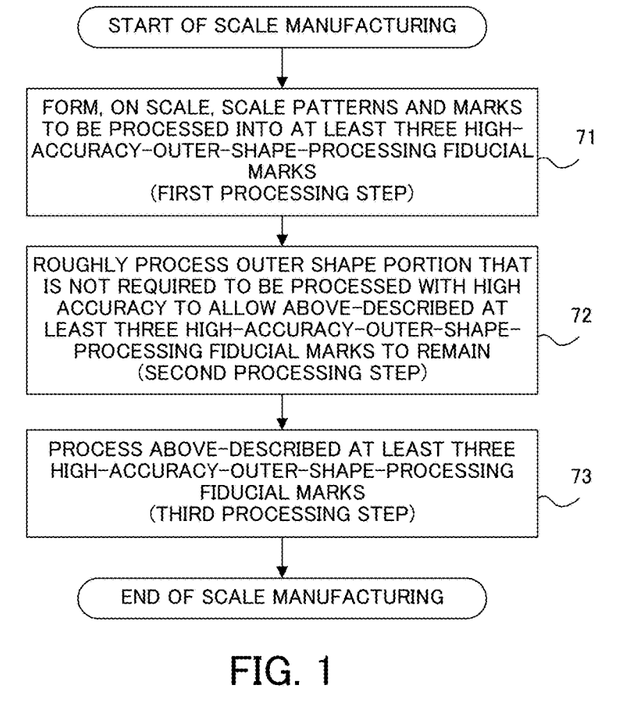
FIG. 1 is a flowchart of a method of manufacturing a rotary scale according to Embodiment 1 of the present invention.

FIG. 1 illustrates a flowchart of a method of manufacturing a rotary scale according to a first embodiment (Embodiment 1) of the present invention. FIG. 2 is a schematic view of the method of manufacturing the rotary scale that is Embodiment 1 of the present invention.

Before starting the manufacturing of the rotary scale illustrated in FIG. 1, a for-processing plate, and a substrate (scale substrate) of a rotary scale 2 on which a reflective film to transfer a pattern of the for-processing plate onto is formed are prepared.

Although the for-processing plate is typically constituted by the substrate that is made of glass and on which a chromium film pattern is formed, the for-processing plate in this embodiment may include the substrate made of a different raw material such as plastic or may have a pattern formed thereon that is composed of a different raw material such as chromium oxide.

The rotary scale 2 uses the substrate made of plastic such as acrylic (PMMA) or polycarbonate (PC) and including an aluminum film, as the reflective film, formed on a surface of the substrate. The substrate of the rotary scale 2 may be made of a material such as glass or float glass, and may include the chromium film as the reflective film.

Although a description will be made below of the rotary scale to be used for a reflective rotary encoder that includes the substrate made of acrylic (PMMA), and the reflective film made of aluminum, the rotary scale may include such substrate and film as described above. The film may be, instead of the reflective film, a light-shielding film that allows the rotary scale to be used as a transmissive rotary scale.

Figure 2A:
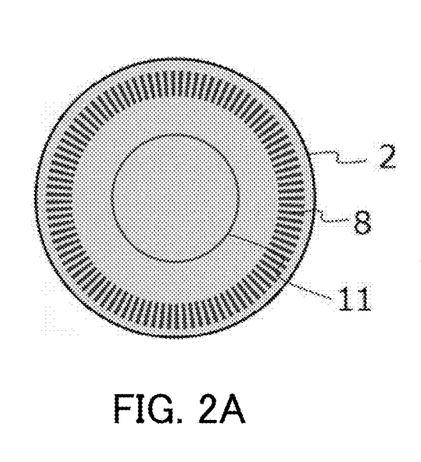
FIGS. 2A to 2H are a schematic view of the method of manufacturing the rotary scale according to Embodiment 1 of the present invention.
Figure 2B:
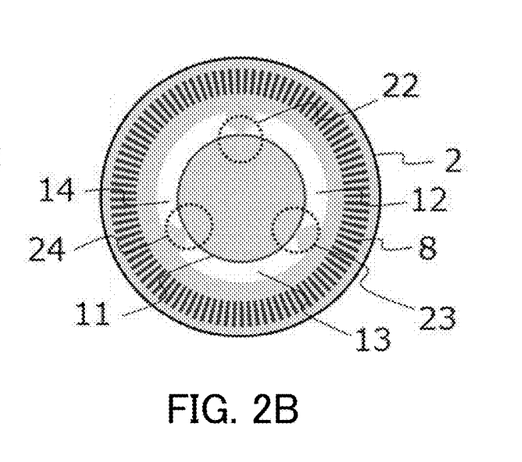

As illustrated in FIGS. 1 and 2A, upon start of the manufacturing of the rotary scale, the method of manufacturing the rotary scale according to Embodiment 1 of the present invention forms, as a first processing step 71, a radial scale pattern 8 by using the for-processing plate, and the substrate and the reflective film of the rotary scale 2 while forming high-accuracy-outer-shape-processing fiducial marks 11 on the rotary scale 2. The high-accuracy-outer-shape-processing fiducial marks 11 are marks together indicating an outer shape of a rotating shaft (members to fix the rotary scale 2, such as the shaft and the hub) whose center axis is made coincide with a center axis of the scale pattern 8. That is, the high-accuracy-outer-shape-processing fiducial marks 11 are marks together indicating a target processing shape. In addition, the high-accuracy-outer-shape-processing fiducial marks 11 are, as illustrated in FIG. 2B, marks that allow high-accuracy-outer-shape-processing-position fiducial marks 22, 23 and 24 to remain at least three locations after processing of the outer shape. As described above, the first processing step 71 is a step of forming the scale pattern 8 on the scale substrate and forming the marks 11 together indicating the outer shape of the rotating shaft whose center axis is made coincide with the center axis of the scale pattern 8.

Next, as illustrated in FIGS. 1 and 2B, the method of manufacturing the rotary scale according to Embodiment 1 of the present invention roughly processes, as a second processing step 72, outer shape portions 12, 13, and 14 (first area) for which a high processing accuracy is not required. This processing is performed such that, of the high-accuracy-outer-shape-processing fiducial marks 11, the high-accuracy-outer-shape-processing fiducial marks 22, 23, and 24 remain at the at least three locations. The high-accuracy-outer-shape-processing fiducial marks 22, 23, and 24 each constitute at least part of the high-accuracy-outer-shape-processing fiducial marks 11. The outer shape portions 12, 13, and 14 (first area) are through holes (groove portions) including mark portions of the high-accuracy-outer-shape-processing fiducial marks 11 excluding the high-accuracy-outer-shape-processing fiducial marks 22, 23, and 24 and each having a predetermined width (first width). That is, the second processing step 72 is a step of roughly processing (cutting) the first area of the scale substrate including the high-accuracy-outer-shape-processing fiducial marks 11 and having the first width to form the through holes (groove portions). In other words, the second processing step 72 roughly processes (cuts) areas located outside of the high-accuracy-outer-shape-processing fiducial marks 11 (that is, located at a scale-pattern-8 side), at mark portions excluding the high-accuracy-outer-shape-processing fiducial marks 22, 23, and 24. Processing the areas into shapes each having a size larger than that of each of the high-accuracy-outer-shape-processing fiducial marks 11 consequentially makes marginal portions of the roughly processed through holes (groove portions) not contact the rotating shaft including the shaft and the hub and being fixed to the rotary scale.

Examples of the second processing step 72 include ice-melt cutting using a laser, and processing using an engraving machine. The second processing step 72 may be performed by using an alternative method.

Figure 2C:
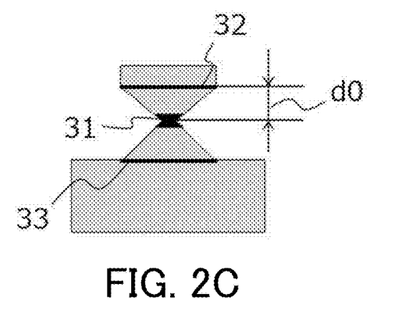
Figure 2D:
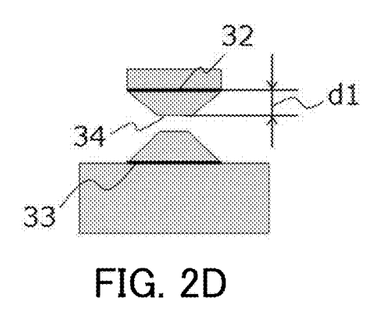
Figure 2E:
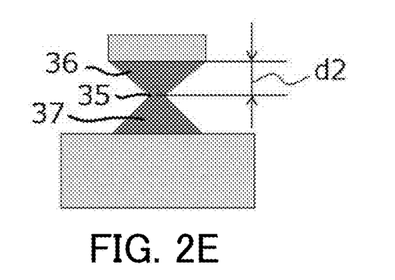
Figure 2F:
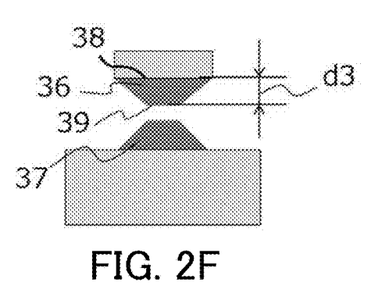
Figure 2G:
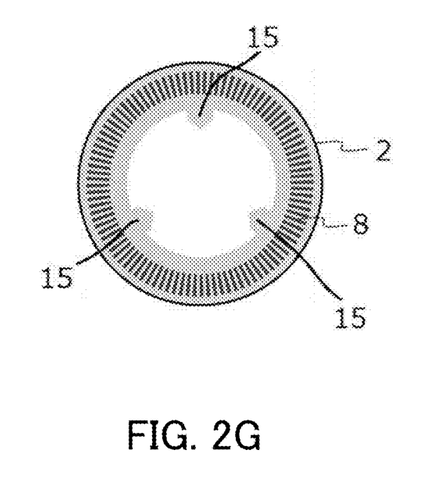

Finally, as illustrated in FIGS. 1 and 2G, the method of manufacturing the rotary scale according to Embodiment 1 of the present invention processes (cuts), as a third processing step 73, the high-accuracy-outer-shape-processing fiducial marks 22, 23, and 24 at the at least three locations remaining after the second processing step 72. A detailed description will be given below of the third processing step 73.

FIG. 2C is an enlarged view of a periphery of the high-accuracy-outer-shape-processing fiducial mark 22. Although the high-accuracy-outer-shape-processing fiducial mark 22 will be described below, a description of the high-accuracy-outer-shape-processing fiducial marks 23 and 24 will be omitted because the same description as that for the high-accuracy-outer-shape-processing fiducial mark 22 is applicable also to the high-accuracy-outer-shape-processing fiducial marks 23 and 24.

The high-accuracy-outer-shape-processing fiducial mark 22 is constituted by a pattern 31 as a cutting reference position, and patterns 32 and 33 each located at a position slightly (for example, by a distance d0 as illustrated in FIG. 2C) away from the pattern 31 in a radius direction. That is, the high-accuracy-outer-shape-processing fiducial mark 22 includes the pattern 31 as the cutting reference position, the pattern 32 (second mark) having an enlarged shape of the pattern 31, and the pattern 33 (third mark) having a reduced shape of the pattern 31. The patterns 31, 32, and 33 together have the same center axis identical to the center axis of the scale pattern 8. The above-described second processing step 72 cuts the outer shape portions 12, 13, and 14 (i.e., the first area having the first width) including the pattern 31, and at least one of the second mark and the third mark (in this embodiment, the second mark). The third processing step 73, which is this step, cuts the pattern 31 (i.e., the second area having a second width narrower than the first width) provided between the second and third marks. An actual processing position accuracy at a target processing position can be checked by measuring a distance d1 between the pattern 32 and a high-accuracy-outer-shape-formation surface 34 illustrated in FIG. 2D. In the present invention, it is not essential to check the processing position accuracy (displacement amount).

Next, as an example different from that illustrated in FIG. 2C, a description will be given of the high-accuracy-outer-shape-processing fiducial mark 22 illustrated in FIG. 2E. The high-accuracy-outer-shape-processing fiducial mark 22 includes a mark 36 and a mark 37 both formed in an area surrounding a pattern 35 as the cutting reference position (an area extending from the pattern 35 by a distance d2 as illustrated in FIG. 2E). That is, the high-accuracy-outer-shape-processing fiducial mark 22 includes the pattern 35 as the cutting reference position, the mark 36 (fourth mark) having a predetermined width from the pattern 35 toward outside of the pattern 35, and the mark 37 (fifth mark) having the predetermined from the pattern 35 toward inside of the pattern 35. The pattern 35 and the marks 36 and 37 together have the same center axis identical to the center axis of the scale pattern 8. The above-described second processing step 72 cuts the outer shape portions 12, 13, and 14 (the first area having the first width) including the pattern 35, and at least one of the fourth mark and the fifth mark (in this embodiment, the fourth and fifth marks). Similarly, the third processing step 73, which is this step, cuts the pattern 35 provided between the fourth and fifth marks (the second area having the second width narrower than the first width). In forming the high-accuracy-outer-shape-processing fiducial marks 11 at the above-described first processing step 71, the pattern 35 and the marks 36 and 37 may be formed separately, or may be formed as a single mark. As in the case of processing the above-described mark 31, an actual processing position accuracy at the processing position can be checked by measuring a distance d3 between an end portion 38 and an end portion 39 in a radius direction of the mark 36 (or the mark 37) illustrated in FIG. 2F. Also in this case, as in FIG. 2C, it is not essential, in the present invention, to check the processing position accuracy (displacement amount).

Acrylic (PMMA) that is the substrate of the rotary scale is, as described above, a material difficult to process due to its viscous property, whereas the patterns 31 and 35 (second area) each as the cutting reference position are easy to process because their length (i.e., a length in a horizontal direction in each of FIGS. 2C and 2E) in a circumferential direction required to be cut is short. That is, the pattern 31 or the pattern 35 (second area) cut at the third processing step 73, which is this step, has the second width narrower than the first width that each of the outer shape portions 12, 13, and 14 (first area) cut at the second processing step 72 has. The length of the second area in the circumferential direction is significantly shorter than the length of the first area in the circumferential direction. As described above, the third processing step 73 is a step of cutting the second area that includes the pattern 31 (or the pattern 35) of each of the high-accuracy-outer-shape-processing fiducial marks 22, 23, and 24 remaining after the cutting of the outer shape portions 12, 13, and 14 (first area), in which the scale substrate has the length in the circumferential direction shorter than that in the first area and that has the second width narrower than the first width. This enables processing, with a high accuracy, the area cut at the third processing step 73 even when the scale substrate is composed of a material difficult to process, which enables processing the area at a high accuracy while achieving a high diameter dimensional accuracy of a circle formed by the high-accuracy-outer-shape-formation surfaces 34 at the at least three locations or the high-accuracy-outer-shape-formation surfaces 39 connected to one another and a high coaxiality between the center axis of the radial scale pattern 8 and a center axis of the circle formed by the high-accuracy-outer-shape-formation surface 34 or the high-accuracy-outer-shape-formation surfaces 39. Although this embodiment cuts, at the third processing step 73, the patterns 31 (or the patterns 35) at the three locations, all of the remaining patterns 31 (or the patterns 35) may be cut when three or more of the high-accuracy-outer-shape-processing fiducial marks 11 remain after the second processing step. As described above, Embodiment 1 of the present invention cuts, at the third processing step 73, the patterns 31 (or the patterns 35) at the at least three locations.

FIG. 2G illustrates the rotary scale 2 manufactured through the above-described processing step.

The rotary scale 2 of this embodiment includes the scale pattern 8 and protrusions 15. The protrusions 15 are provided at least three locations in the circumferential direction of the scale substrate and each have, at one end (tip portion), contact surfaces 34 and 39 contacting the rotating shaft (the members to fix the rotary scale 2, such as the shaft and the hub). The protrusions 15 each have a taper shape whose width in the circumferential direction becomes narrower toward the one end (a contact surface of the tip portion) from the other end (in other words, as further from the scale pattern 8). The protrusions 15 are formed at the above-described processing step (in particular, the second and third processing steps). That is, the protrusions 15 are formed by cutting the second area that includes the patterns 31 (or the patterns 35) of the high-accuracy-outer-shape-processing fiducial marks 11 remaining after the cutting of the outer shape portions 12, 13, and 14 (first area) each having the first width, in which the scale substrate has the length in the circumferential direction shorter than that in the first area and that has the second width narrower than the first width. The protrusions 15 formed through the above-described processing steps have contact surfaces 34 and 39 together forming a virtual circle that has a high diameter dimensional accuracy, thereby achieving a high coaxiality between the enter axis of the scale pattern 8 and a center axis of the virtual circle. Similarly, the contact surfaces 34 and 39 are also processed with high accuracy because a length required to form (cut) them is short. The taper shape that each of the protrusions 15 has is formed by cutting the first area at the second processing step 72.

Figure 2H:
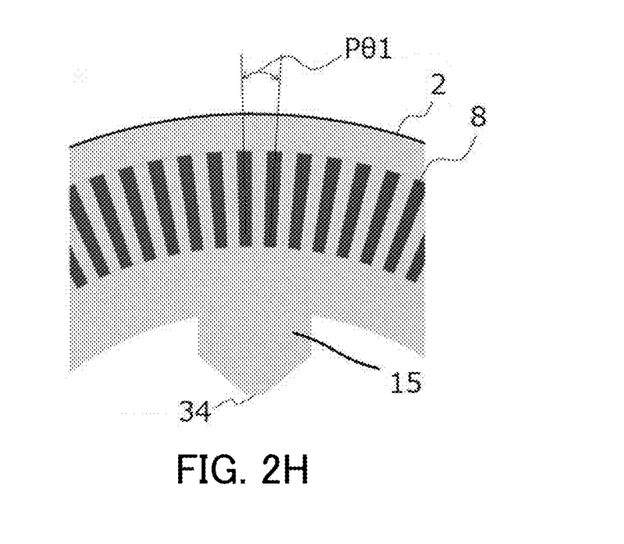
Figure 3:
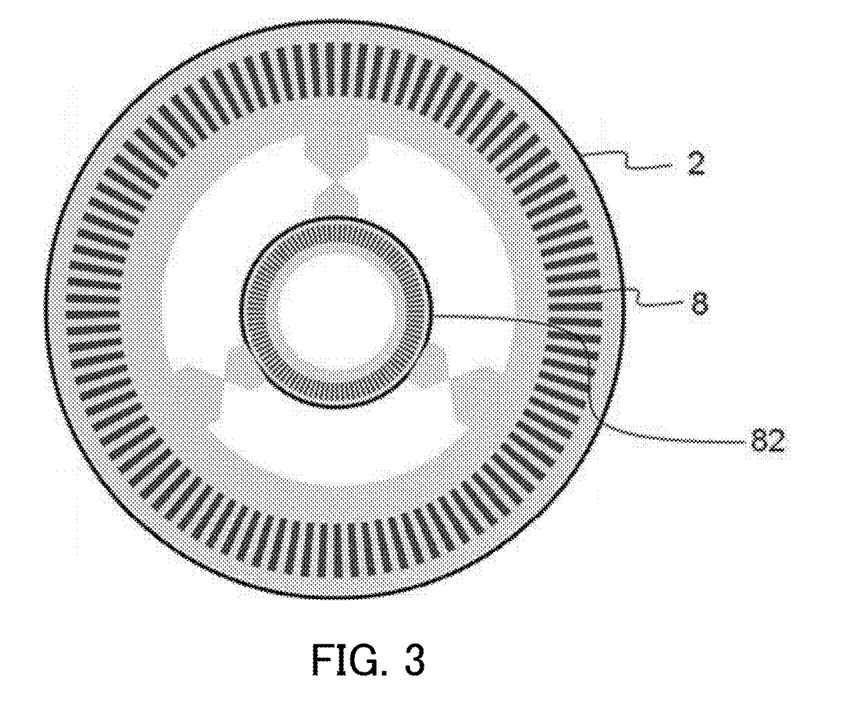
FIG. 3 is a schematic view of another configuration example in the method of manufacturing the rotary scale according to Embodiment 1 of the present invention.

As illustrated in FIG. 3, the processing of the outer shape of the rotary scale 2 according to the present invention can be applied also to an outer shape inside of the rotary scale 2. FIG. 3 illustrates, as an example, a rotary scale 82 located inside the rotary scale 2 described so far with reference to FIGS. 2A to 2H and having a short diameter. The rotary scale 82 may not be located outside of the rotary scale 2. However, since the rotary scale 82 can be formed by utilizing a portion not used to form the rotary scale 2, a configuration illustrated in FIG. 3 that enables a reduction in material cost may be employed. Although the present invention employs the configuration in which the protrusions 15 are provided more inside of the rotary scale than the scale pattern 8 as illustrated in FIG. 2, an alternative configuration in which the protrusions 15 are provided more outside of the scale pattern 8 may be employed. In this case, the second processing step 72 roughly processes (cuts), of the mark portions excluding the high-accuracy-outer-shape-processing fiducial marks 22, 23, and 24, the area located inside of the high-accuracy-outer-shape-processing fiducial marks 11 (that is, located on the scale-pattern-8 side). Processing the area into shapes having a size smaller than that of each of the high-accuracy-outer-shape-processing fiducial marks 11 consequently makes the marginal portions of the roughly processed through holes (groove portions) not contact the rotating shaft including the shaft and the hub and being fixed to the rotary scale.

The above-described manufacturing method can achieve, at low cost, a rotary scale including a plastic substrate or a glass substrate and having a high outer shape accuracy.

Thus, this embodiment enables processing an outer shape while achieving a high coaxiality between a scale pattern having a high resolution and the outer shape to which a rotating shaft is fixed high accuracy.

Embodiment 2

With reference to FIGS. 2 to 8, a description will be given of a rotary encoder that is a second embodiment (Embodiment 2) of the present invention.

Figure 4A:
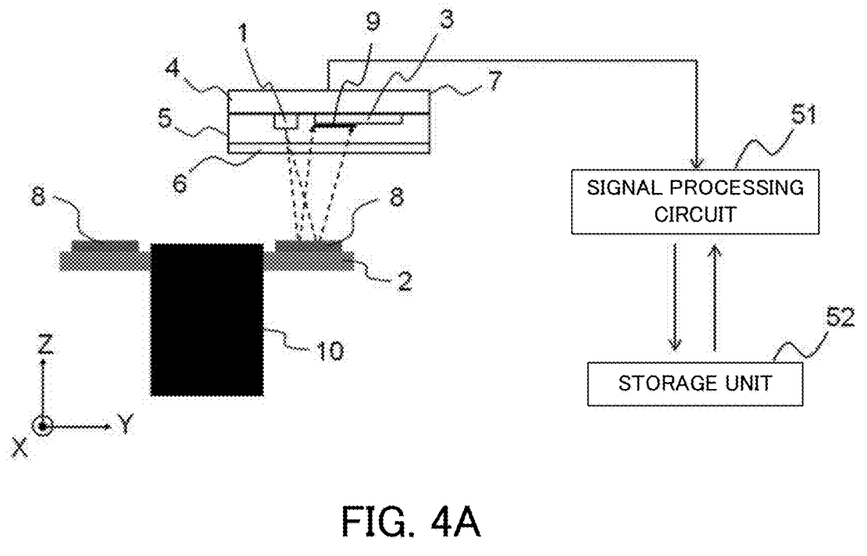
FIGS. 4A and 4B are a schematic view illustrating a configuration of a rotary encoder according to Embodiment 2 of the present invention.
Figure 4B:
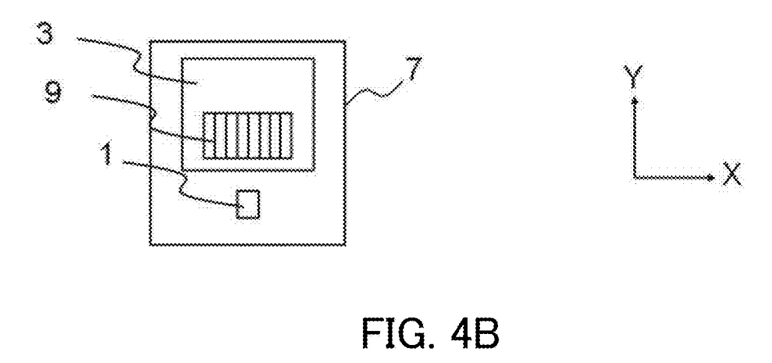

FIG. 4A is a schematic view illustrating a configuration of the rotary encoder according to Embodiment 2 of the present invention. FIG. 4B is a schematic view of an angle detection head 7 included in the rotary encoder viewed from a bottom (−Z direction) toward a top (+Z direction) of FIG. 4A.

The rotary encoder according to this embodiment is constituted by a for-fixing-to-scale member 10 (a rotating shaft of a rotating member) such as a shaft and a hub each being a rotation driver, a rotary scale 2 to be fixed to a for-fixing-to-scale member 10, the angle detection head 7 to be fixed to a fixer, a signal processing circuit 51, and a storage unit 52. The rotary scale 2 is the same as that described in Embodiment 1.

The signal processing circuit 51 performs an interpolation process on an encoder signal acquired by the angle detection head 7, writing and reading of the signal into and from the storage unit 52, output of a position signal, and the like. Although a description will be made below of a reflective optical rotary encoder, the rotary encoder may be a transmissive encoder. A detection method performed by the rotary encoder may be, instead of an optical detection method, one that detects a physical property such as a capacitive or magnetic detection method.

The angle detection head 7 is a light-receiving/emitting angle detection head including a light source 1 constituted by LEDs, a light-receiving element 3 including a light-receiving element array 9, a semiconductor element constituted by a photo IC chip including a I-V conversion signal processing circuit, and a printed circuit board 4 on which the light source 1, the light-receiving element 3, and the semiconductor element are packaged together and mounted. In this embodiment, the angle detection head 7 includes a plastic 5 on the printed circuit board 4, and a transparent glass substrate 6 on the plastic 5.

The rotary scale 2 is rotated about a Z axis together with the scale fixing member 10. The angle detection head 7 is placed so as to face the rotary scale 2. A light flux emitted from the light source 1 included in the angle detection head 7 is projected onto the scale pattern 8 of the rotary scale 2. Thereafter, the light flux is reflected by the scale pattern 8, and then reflected toward the light-receiving element array 9 in the angle detection head 7. Consequently, the light-receiving element array 9 receives a reflection distribution of the scale pattern 8 as an image. That is, the angle detection head 7 functions as a detector that detects the light reflected by the rotary scale 2, and has a configuration in which the light flux received by the light-receiving element array 9 is converted into an electric signal and then sent as the position signal to the signal processing circuit 51 illustrated in FIG. 4A.

FIG. 2G is a top view illustrating the configuration of the rotary scale 2 used in each of the embodiments of the present invention. FIG. 2H is a partially enlarged view of the rotary scale 2 illustrated in FIG. 2G.

As illustrated in FIG. 2H, the scale patterns 8 have radial modulation periods Pθ1 thereamong.

Although Embodiment 2 of the present invention will describe an incremental rotary encoder in which the patterns of the rotary scale 2 have the modulation periods Pθ1 at an angle detection position that are each 100 μm, Embodiment 2 of the present invention is not limited to this.

Next, a description will be given of acquisition of rotation phase information.

Figure 5:
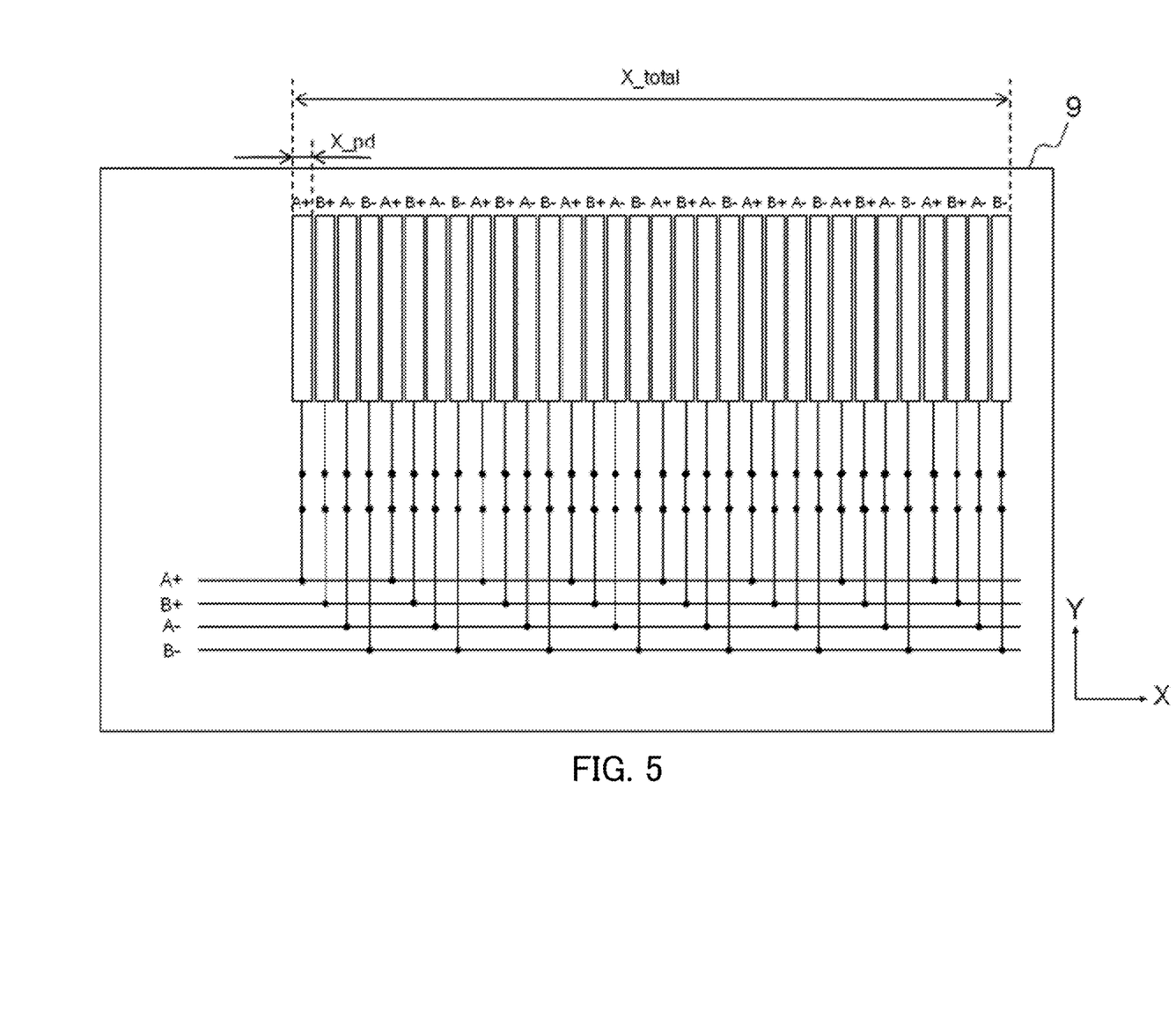
FIG. 5 is a plan view illustrating a distribution of light-receiving surfaces of a light-receiving element array in the rotary encoder according to Embodiment 2 of the present invention.
Figure 6:
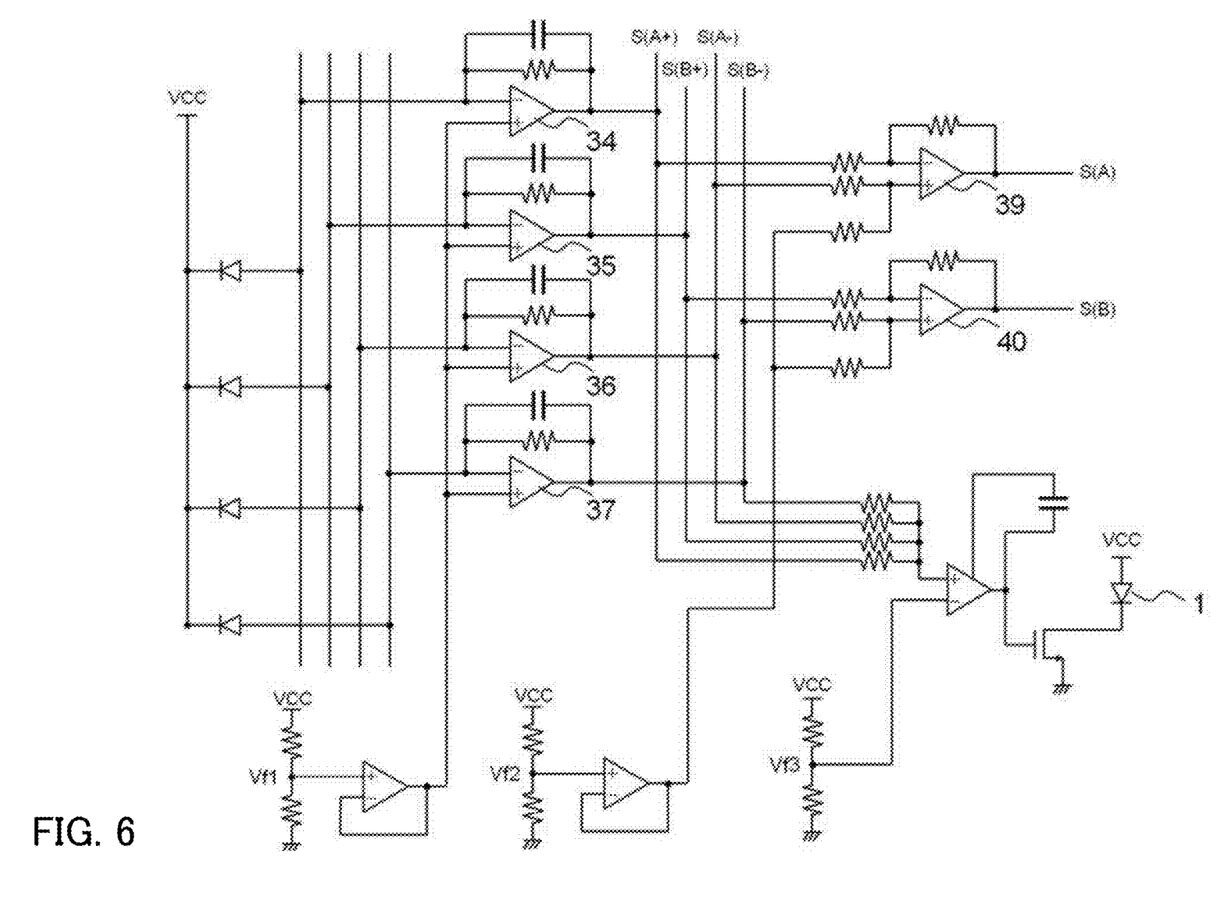
FIG. 6 is a diagram illustrating a signal processing circuit of an angle detection head in the rotary encoder according to Embodiment 2 of the present invention.

FIG. 5 is a plan view illustrating an arrangement of light-receiving surfaces of the light-receiving element array 9 in the light-receiving element 3 in Embodiment 2 of the present invention. FIG. 6 is a diagram illustrating a signal processing circuit of the angle detection head 7 according to Embodiment 2 of the present invention. The light-receiving element array 9 in FIG. 5 is constituted by 32 light-receiving elements arranged in an X axis direction at the modulation period and each having a width of 50 µm in the X direction denoted by X_pd. An entire width X_total of the light-receiving element array 9 is 1600 µm. Since the patterns are projected on the scale at a magnification of twice, the light is detected on the scale within a range of 800 µm in the X direction.

Although, in this embodiment, a description will be given of, because of its advantage that enables parts sharing leading to cost reduction, a rotary encoder provided with the light-receiving element a rectangular light-receiving surface shape that is used also for a linear encoder, a light-receiving element whose light-receiving surface is optimized to match a curvature of the scale pattern may alternatively be used for the rotary encoder.

Outputs from the light-receiving element array 9 are connected to four initial amplifiers. As illustrated in FIG. 6, the initial amplifiers to be used to produce four-phase sinusoidal wave outputs S(A+), S(B+), S(A−), and S(B−) are constituted by four I-V conversion amplifiers (34, 35, 36, and 37). The four-phase sinusoidal waves have relative phase differences thereamong; when S(A+) is regarded as a reference to a detection modulation period, S(B+) has a phase difference of approximately +90 degrees from the reference, S(A−) has a phase difference of approximately +180 therefrom, and S(B−) has a phase difference of approximately +270 therefrom. The four-phase sinusoidal wave outputs S(A+), S(B+), S(A−), and S(B−) are used by the signal processing circuit 51 to perform, via a phase-A differential amplifier 39 and a phase-B differential amplifier 40, calculations expressed as:

$$S(A)=S(A+)-S(A-) \quad (1); \text{ and}$$

$$S(B)=S(B+)-S(B-) \quad (2)$$

to produce two-phase sinusoidal wave signals S(A) and S(B).

It is desirable to correct an offset error contained in each of S(A) and S(B) and a gain ratio between S(A) and S(B) both caused due to a difference in offset and gain among the amplifiers. For example, the correction is performed by detecting an amplitude ratio from (a maximum value minus a minimum value)/2 of each of S(A) and S(B) in a predetermined area and then making amplitudes identical to each other. Similarly, an offset error amount is detected from (the maximum value plus the minimum value)/2, and then the offset is corrected. In each of the former case and the latter case, a correction value is prestored in the storage unit 52, and read therefrom to perform the correction in the position detection.

Furthermore, a calculation is performed to acquire Φ1 expressed as:

$$\Phi 1 = A\ TAN\ 2[S(A),S(B)]. \quad (3)$$

In Expression (3), A TAN 2[Y,X] represents an arc tangent calculation function for determining a quadrant of the coordinates and converting the same into a phase of 0 to 2π.

As described in Embodiment 1, as illustrated in FIGS. 2H and 2G, the high-accuracy-outer-shape-formation surfaces 34 at the at least three locations are formed such that processing positions are processed with a high accuracy. The rotary scale 2 fabricated as described above is, as illustrated in FIG. 7, assembled such that the rotary scale 2 is fitted into the for-fixing-to-scale member 10 having a sufficient diameter dimensional accuracy and a sufficient coaxiality. As described in Embodiment 1, the rotary scale 2 according to this embodiment has the high-accuracy-outer-shape-formation surfaces 34 at the at least three locations together forming a circle with a high diameter dimensional accuracy, which enables easily performing a fitting operation in the assembling.

Figure 7:
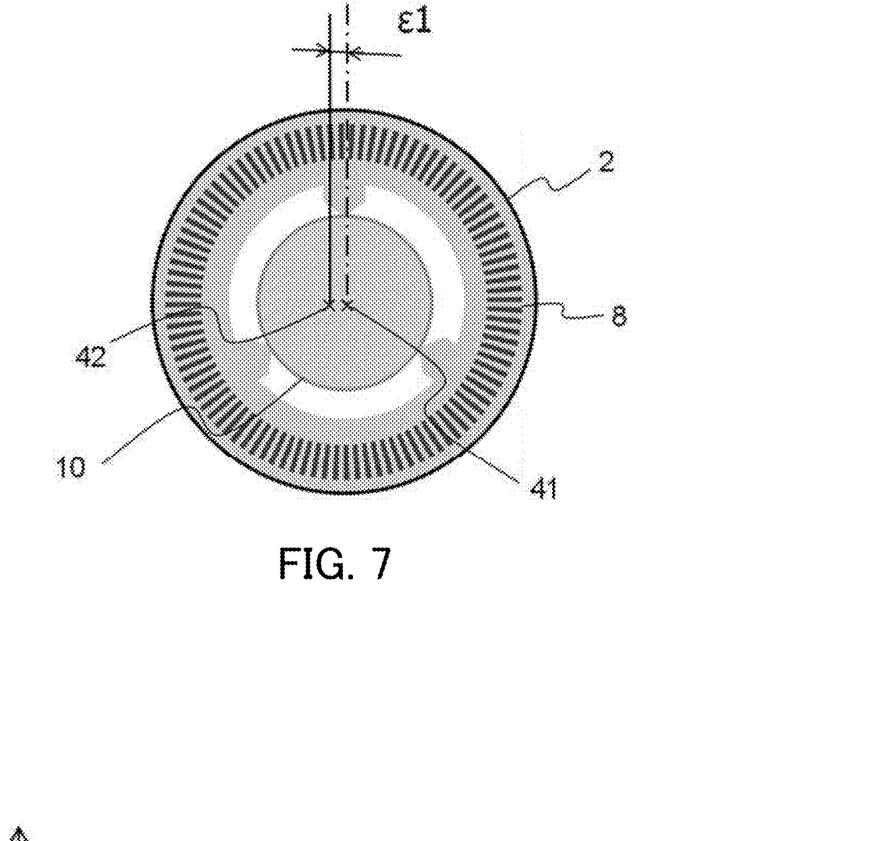
FIG. 7 is a diagram illustrating a rotary scale 2 according to Embodiment 2 of the present invention being assembled by fitting of a scale fixing member 10.

Moreover, the high-accuracy-outer-shape-formation surfaces 34 have a high coaxiality to the scale pattern 8, which enables reducing a difference ε1 in position between a rotating shaft 42 of the rotary scale 2 and a rotating shaft 41 of the scale fixing member 10 to an extremely small value.

Figure 8:
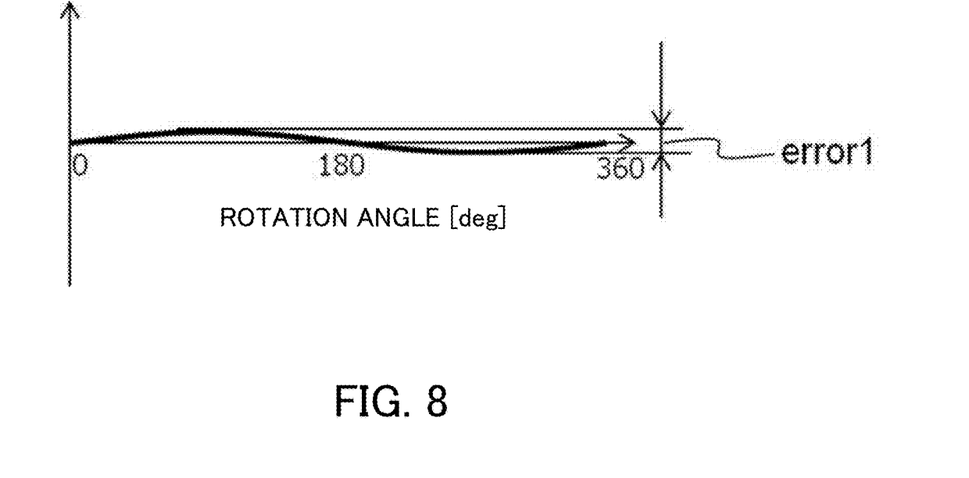
FIG. 8 is a diagram illustrating reduction in an angle detection error in the rotary encoder according to Embodiment 2 of the present invention.

As illustrated in FIG. 8, such a rotary encoder is capable of performing high-accuracy rotation angle detection.

When the difference ε1 has a large value, it is difficult, as described above and as illustrated in FIG. 10C, to reduce a rotation angle detection error due to an influence of an eccentricity between the scale fixing member 10 and the scale pattern 8. Conventionally, to reduce the rotation angle detection error, the adjustment of the eccentricity of the rotary scale, and the reduction of the influence of the eccentricity by a calculation using multiple angle detection heads have been performed as described above.

In contrast, employing the configuration described in this embodiment enables easily positioning the rotary scale without the eccentricity adjustment, which enables achieving a rotary encoder that operates highly accurately with a single angle detection head. That is, it is unnecessary for the rotary encoder to use the multiple angle detection heads, which enables achieving, at low cost, the rotary encoder according to the present invention that has a small size.

As described above, employing the configuration according to this embodiment enables achieving a high-accuracy and low-cost rotary encoder with a small size.

Embodiment 3

Figure 9:
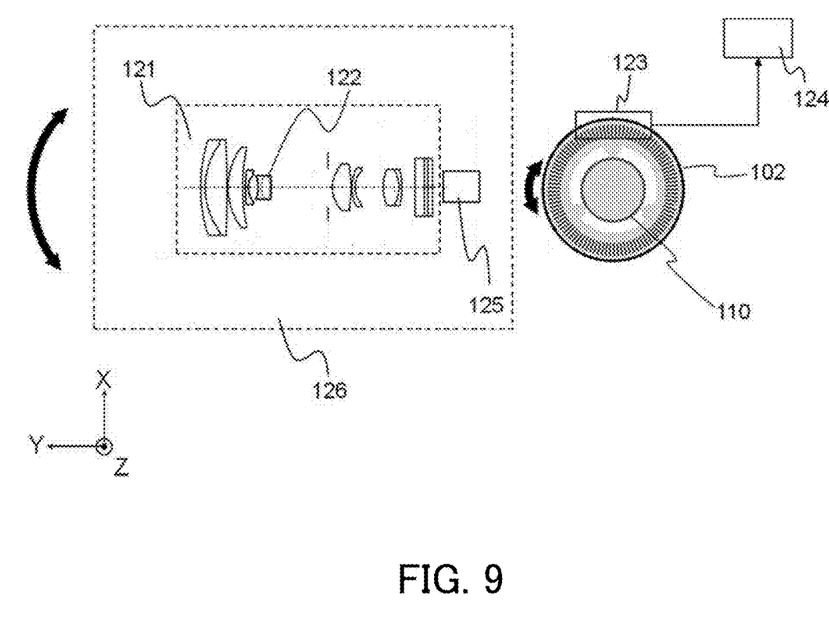
FIG. 9 is a sectional schematic view of a surveillance camera including a rotary encoder according to Embodiment 3 of the present invention.

With reference to FIG. 9, a description will be given of an example of a rotary encoder according to a third embodiment (Embodiment 3) of the present invention installed in a lens barrel (image pickup device) of a surveillance camera (image pickup apparatus). The rotary encoder described in this embodiment is the same as that described in Embodiment 2.

FIG. 9 is a schematic sectional view of the surveillance camera including the rotary encoder according to the present invention viewed from above. Reference numeral 121 denotes a lens unit (image pickup optical system), 122 a drive lens (optical member) constituting part of the lens unit 121, 123 an angle detection head, 124 a CPU, 125 an image pickup element that photoelectrically converts an object image formed by the image pickup optical system, and 126 a lens barrel of the surveillance camera. The lens unit 121, the drive lens 122, the CPU 124, and the image pickup element 125 together constitute the image pickup device. The lens barrel 126 (rotating member) includes a rotating shaft to which the rotary encoder described in Embodiment 2 is fixed.

The lens unit 121 and the image pickup element 125 are provided to the lens barrel 126 of the surveillance camera. The CPU 124 is provided to a body of the surveillance camera (a body of the image pickup apparatus). The lens unit 121, the image pickup element 125, and the like disposed in the lens barrel 126 are rotationally driven in an integrated manner depending on a rotation angle of the rotary scale 102 detected by the angle detection head 123 in response to rotational driving of the lens barrel 126 (rotating member)

by an actuator (driver) intended for driving the lens barrel. That is, the surveillance camera according to this embodiment controls the rotation of the lens barrel 126 by controlling the driver (not illustrated) provided to the surveillance camera depending on an output from the rotary encoder described in Embodiment 2.

The drive lens 122 constituting part of the lens unit 121 is, for example, a lens used for autofocus, and is displaceable in a Y direction that is an optical axis direction. The drive lens 122 may be any other lens, such as a zoom lens, that is configured to be driven. The lens unit 121 may have an alternative configuration in which the drive lens 122 is omitted. This is because such a configuration does not deviate from the scope of features covered by the present invention.

The rotary scale 102 fixed to a for-fixing-to-scale member 110 (i.e., the rotating shaft of the lens barrel 126) included in the rotary encoder according to the present invention is rotated by the actuator (not illustrated) serving as the driver about an axis of the for-fixing-to-scale member 110 relatively to the angle detection head 123. This rotation causes the lens barrel 126 to be driven about a Z axis (a direction indicated by an arrow) corresponding to a horizontal direction (pan). Consequently, a signal is produced from the angle detection head 123 of the rotary encoder corresponding to a rotational displacement of the rotary scale 102 and output to the CPU 124. The CPU 124 produces a drive signal for rotating the lens barrel 126 at a desired rotation angle. The lens barrel 126 is driven based on the drive signal. Although the lens barrel 126 has been described as being driven in the horizontal direction (pan), the present invention can, needless to say, be applied also when the lens barrel 126 is driven in a vertical direction (tilt).

Examples of specifications required for the surveillance camera include high-accuracy rotation that allows accurate focusing on an object, high-speed rotation that allows speedy focusing on the object, cost efficiency, small size, robustness, and high sensitivity.

The rotary scale according to this embodiment of the present invention, and the rotary encoder in which the rotary scale is installed have the configuration described also in Embodiment 2. For this reason, providing the rotary encoder according to the present invention to the lens barrel of the surveillance camera enables achieving a lens barrel having a sufficient rotation phase accuracy, and a surveillance camera including the lens barrel.

Moreover, the rotary scale and the rotary encoder according to the present invention are easy to assemble, and together can achieve high-accuracy rotation phase angle detection. This enables reducing a man-hour required to assemble the lens barrel that includes the rotary encoder according to the present invention and the surveillance camera that includes the lens barrel, and increasing a passing rate of them, which enables achieving the low-cost lens barrel, and the low-cost surveillance camera.

Furthermore, employing the configuration described in this embodiment allows the rotary scale to be easily positioned without the eccentricity adjustment, which enables achieving a lens barrel capable of highly accurately detecting the rotation angle with a single angle detection head, and the surveillance camera including the lens barrel.

The present invention can provide a method of manufacturing a rotary scale that is to be used for the rotary encoder together with the angle detection head for detecting rotation angle information and that is capable of highly accurately processing at least three high accuracy outer shape processing positions to be each used as a reference in the fixing of the scale while achieving a high coaxiality between a scale pattern and an outer shape.

Moreover, it is unnecessary, in fixing the rotary scale to a shaft and a hub, to perform position adjustment of the rotary scale and to take a countermeasure such as cancelling an influence of eccentricity by using multiple angle detection heads, which enables achieving a small, high accuracy rotary encoder at low cost.

This enables providing the low-cost, small rotary encoder that can achieve a sufficient rotation phase accuracy, a lens barrel in which the rotary encoder is installed, and a surveillance camera including the rotary encoder.

As described above, the present invention enables highly accurately processing positions of an outer shape while achieving a high coaxiality between a scale pattern with a high resolution and the outer shape to which the rotating shaft is to be fixed.

For instance, the rotary encoder according to the present invention can be applied not only to the surveillance camera, but also to various driving apparatus. Specifically, the rotary encoder can be applied to detect a rotation angle of each of joins of a robot arm having, at its arm joint, a rotation drive mechanism. That is, applying the rotary scale according to the present invention to the robot apparatus provided with a driver that rotates the robot arm to fix the rotating shaft of the robot arm to the rotary scale enables sufficiently detecting the rotation angle of the robot arm. As described above, applying the rotary scale according to the present invention to a driving apparatus provided with the driver that rotates a rotating member and fixing the rotary scale to the rotating shaft of the rotating member enables sufficiently detecting the rotation angle of the rotating member.

The rotary scale and the rotary encoder according to the present invention can be suitably utilized for driving apparatuses installed in image pickup apparatuses and robot apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012322, filed on Jan. 26, 2015, which is hereby incorporated by reference herein in its entirety.

What is claimed is:

1. A method of manufacturing a rotary scale to be fixed to a rotating shaft of a rotating member, the method comprising: a first step of forming, on a scale substrate, a scale pattern and a mark indicating an outer shape of the rotating shaft positioned such that a center axis of the rotating shaft coincides with a center axis of the scale pattern; a second step of cutting a first area within the scale substrate, the first area including mark portions of the mark excluding at least three mark portions; and a third step of cutting a second area, the second area including the at least three mark portions that remain after the cutting of the first area, having a length in a circumferential direction of the scale substrate shorter than that in the first area and having a second width narrower than a first width of the first area;

wherein the first step forms a second mark having an enlarged shape of the mark and a third mark having a reduced shape of the mark;

wherein the second step cuts the first area including at least one of the second mark and the third mark excluding, the at least three mark portions, and wherein the third step cuts the second area provided between the second mark and the third mark.

2. The method of manufacturing the rotary scale according to claim 1, wherein the first step forms a fourth mark and a fifth mark, the fourth mark having a predetermined width from the mark toward outside of the mark and the fifth mark having a predetermined width from the mark toward inside of the mark.

3. The method of manufacturing the rotary scale according to claim 2,
   wherein the second step cuts the first area including at least one of the fourth mark and the fifth mark excluding the at least three mark portions, and
   wherein the third step cuts the second area provided between the fourth mark and the fifth mark.

4. The method of manufacturing the rotary scale according to claim 1, wherein the scale substrate is made of plastic or glass.

\* \* \* \* \*